(12) United States Patent
Wang et al.

(10) Patent No.: US 7,771,696 B2
(45) Date of Patent: Aug. 10, 2010

(54) NANOCOMPOSITES AND FUNCTIONALIZED CARBON NANOFIBERS

(75) Inventors: David H. Wang, Beavercreek, OH (US); Loon-Seng Tan, Centerville, OH (US)

(73) Assignee: University of Dayton, Dayton, OH (US)

( * ) Notice: Subject to any disclaimer, the term of this patent is extended or adjusted under 35 U.S.C. 154(b) by 932 days.

(21) Appl. No.: 11/494,041

(22) Filed: Jul. 27, 2006

(65) Prior Publication Data

US 2008/0025905 A1    Jan. 31, 2008

(51) Int. Cl.
*D01F 9/12* (2006.01)
(52) U.S. Cl. .................. 423/447.1; 977/745; 977/847
(58) Field of Classification Search ............. 423/447.2, 423/447.1, 447.3, 445 B; 977/742–754, 977/842–848
See application file for complete search history.

(56) References Cited

U.S. PATENT DOCUMENTS

| | | | |
|---|---|---|---|
| 5,395,917 | A | 3/1995 | Irwin |
| 6,203,814 | B1 | 3/2001 | Fisher et al. |
| 6,617,398 | B2 | 9/2003 | Yeager et al. |
| 6,646,060 | B1 | 11/2003 | Toyohara et al. |
| 6,852,158 | B2 | 2/2005 | Belmont et al. |
| 7,005,550 | B1 * | 2/2006 | Tan et al. ............ 568/335 |
| 2004/0219093 | A1 | 11/2004 | Kim et al. |

OTHER PUBLICATIONS

Wang, et al., In-situ Polymerization of 6FDFA and 1,3-bis(3-aminophenoxy)benzene in the presence of amine functionalized vapor-grown carbon nanofibers, Polymer Preprints 2005; 46(2): 920-921.*

Saeed, et al., Preparation of electrospun nanofibers of carbon nanotube/polycaprolactone nanocomposite, Polymer 2006; 47:8019-8025.*

Otto Dann, Helmut Fick, Bernd Pietzner, Ekehard Walkenhorst, Rainer Fernbach and Dieter Zeh, Trypanocide Diamidine mit dre isolierten Ringsystemen, Liebigs Ann. Chem, 1975, pp. 160-194.

O.S. Caneiro, J.A. Covas, C.A. Bernardo, G. Caldeira, F.W.J. Van Hattum, J.M. Ting, R.L. Alig and M.L. Lake, Production and Assessment of Polycarbonate Composites Reinforced with Vapour-Grown Carbon Fibres, Composites Science & Technology, Elsvier Science Ltd., 1998.

Jian Chen, Mark A. Harmon, Hui Hu, Yongsheng Chen, Apparao M. Rao, Peter C. Eklund, Robert C. Haddon, Solution Properties of Single-Walled Carbon Nanotubes, www.sciencemag.org, Science, vol. 282, Oct. 2, 1998.

Dennis A. Benson, Ilene Karsch-Mizrachi, David J. Lipman, James Ostell, Barbara A. Rapp and David L. Wheeler, GenBank, Neulic Acids Research, vol. 28, No. 1, 2000.

(Continued)

*Primary Examiner*—Stanley S. Silverman
*Assistant Examiner*—Daniel C. McCracken
(74) *Attorney, Agent, or Firm*—Dinsmore & Shohl LLP

(57) ABSTRACT

A composition is provided in which carbon nanofibers are functionalized with at least one moiety where the moiety or moieties comprise at least one bivalent radical. The composition can include a nanocomposite, such as polyimide films. Methods for making functionalized carbon nanofibers and nanocomposites are also provided.

17 Claims, 5 Drawing Sheets

OTHER PUBLICATIONS

Jeffrey L. Bahr, Edward T. Mickelson, Michael J. Bronikowski, Richard E. Smalley and James M. Tour, The solubility of small diameter single-wall carbon nanotubes in several organic solvents is described, and characterization in 1,2-dichlorobenzene is reported, The Royal Society of Chemistry, 2001.

Benji Maruyama, Khairul Alam, Carbon Nanotubes and Nanofibers in Composite Materials, Sampe Journal, vol. 38, No. 3, May/Jun. 2002.

Charanjeet Sing, Tom Quested, Chris B. Boothroyd, Paul Thomas, Ian A. Kinloch, Ahmed I. Abou-Kandil, and Alan H. Windle, Synthesis and Characterization of Carbon Nanofibers Produced by the Floating Catalyst Method, American Chemical Society, 2002.

Christopher A. Dyke and James M. Tour, Solvent-Free Functionalization of Carbon Nanotubes, American Chemical Society, 2003.

Jong-Beom Baek, Christopher B. Lyons, and Loon-Seng Tan, Grafting of Vapor-Grown Carbon Nanofibers via in-Situ Polycondensation of 3-Phenoxybenzoic Acid in Poly(phosphoric acid), American Chemical Society, 2004, Macromolecules 2004, 37, 8278-8285.

Jong-Beom Baek, Christopher B. Lyons, and Loon-Seng Tan, Covalent modification of vapour-grown carbon nanofibers via direct Friedel-Crafts acylation in polyphosphoric acid, The Royal Society of Chemistry, 2004, J. Mater. Chem. 2004, 14, 2052-2056.

David H. Wang, Marlene Houtz, Jong-Beom Baek, and Loon-Seng Tan, In-Situ Polymerication of 6FDA and 1,3-BIS(3-Amine-Functionalized Vapor-Grown Carbon Nanofibers, Polymer Preprints 2005, 46(2), 920-921.

Dr. Jack Cazes, A Question of Molecular Weight, http://www.ampolymer.com/FRD/Question%20of%20Mw.htm.

Polymer Properties and MW, Chem-421: Introduction to Polymer Chemistry http://www.chem.rochester.edu/~chem421/propsmw.htm.

* cited by examiner

NANOCOMPOSITES AND FUNCTIONALIZED CARBON NANOFIBERS

STATEMENT REGARDING FEDERALLY SPONSORED RESEARCH OR DEVELOPMENT

This invention was made with government support under Contract No. F33615-00-D-5008 awarded by the U.S. Air Force. The government has certain rights in the invention.

BACKGROUND OF THE INVENTION

The present invention relates to a composition comprising carbon nanofibers functionalized with at least one moiety, and more particularly, to a composition and method for making functionalized carbon nanofibers and nanocomposites.

Nanostructures have attracted much attention due to their unique properties for numerous applications such as polymer nanocomposites, electronic devices, field emission display, and hydrogen storage. Carbon-based nanostructures in particular, have shown useful mechanical, electrical, thermal and thermal-mechanical properties and also find application in many technologies, such as tires, chip packaging, epoxies, composites, radiators, heat exchangers, and shields for electromagnetic interference.

There are many types of carbon-based nanostructures, including, for example, buckeyballs, three-dimensional structures, two-dimensional structures, and one-dimensional structures. Traditionally, one-dimensional carbon-based nanostructures are divided into three categories based on their diameter dimensions: (i) single-wall carbon nanotubes or SWNT (e.g., 0.7-3 nm); (ii) multi-wall carbon nanotubes or MWNT (e.g., 2-20 nm); and (iii) carbon nanofibers or CNFs (e.g., 30 nm and above). Compared to SWNT or MWNT, CNFs are more attractive for their relatively low cost and availability in larger quantities as the result of their more advanced stage in commercial production. For example, vapor growth is a typical method for CNF production. With aspect ratios (length/diameter) commonly greater than 800, CNFs can be useful as nanolevel reinforcement for polymeric matrices. Furthermore, since their inherent electrical and thermal transport properties are also typically excellent, they can be used for tailoring their polymer matrix composites into affordable, lightweight, and multifunctional materials.

Some nanostructures can be difficult to process due to their insolubility in most common solvents. Noncovalent and covalent surface modification of nanostructures are two typical approaches to improve solubility in common solvents and dispersion in polymer matrices. While there are some reports of functionalization of SWNT to improve solubility in organic solvents or aqueous media as well as to optimize nanoscale dispersion and interfacial adhesion in solid matrices, there are relatively few reports concerning the covalent modification of CNFs.

Accordingly, there is still a need in the art for a method of functionalizing carbon nanofibers for use in polymer nanocomposites and other applications.

BRIEF SUMMARY OF THE INVENTION

The present invention relates, in part, to the functionalization of CNFs. Functionalized CNFs can provide solubility in common solvents, and dispersion and interfacial adhesion in matrices. Also, nanocomposites made from functionalized CNFs can display temperature-dependent electrical conductivity and have potential applications such as actuation.

In one exemplary embodiment, the invention is a composition comprising CNFs functionalized with at least one moiety wherein the at least one moiety comprises at least one bivalent radical selected from the group consisting of

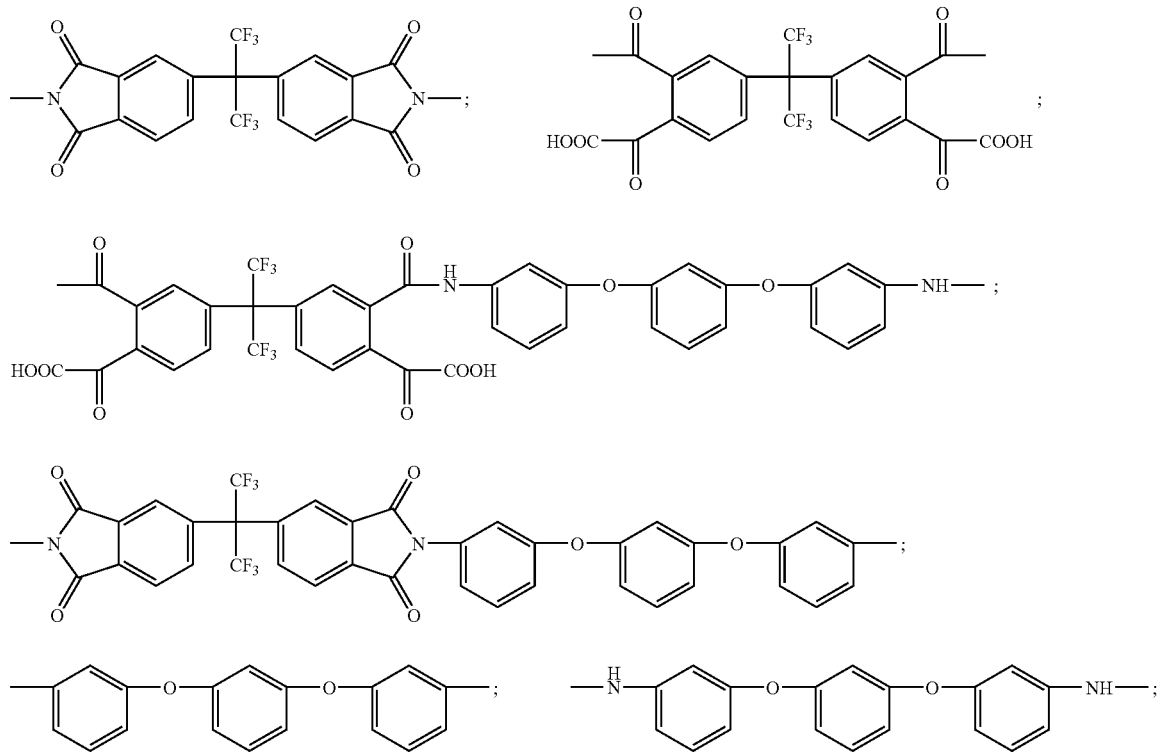

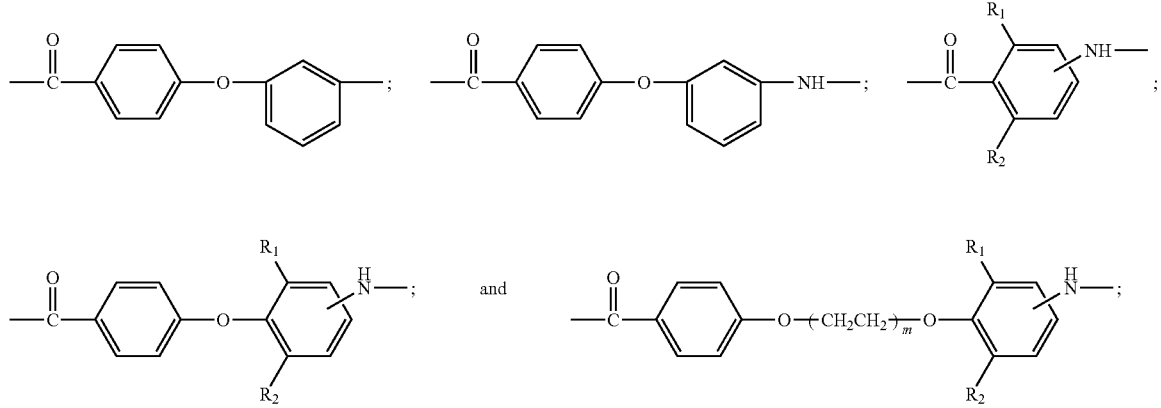
where $R_1$ and $R_2$ can be the same or different and are selected from the group consisting of hydrogen and $C_{1-4}$ alkyl; and m ranges from 1 to 20.
In some exemplary embodiments, the at least one moiety is selected from the group consisting of
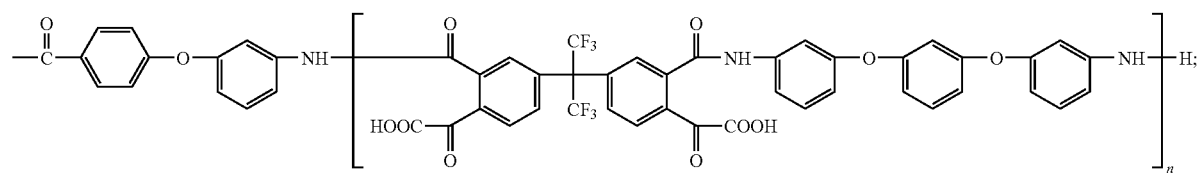
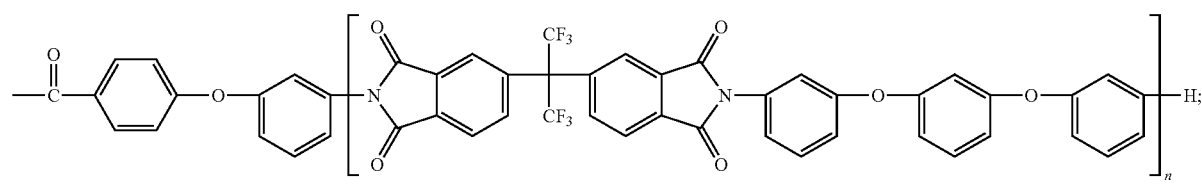
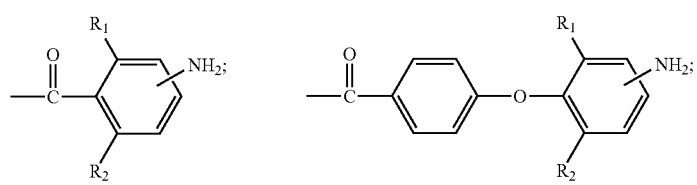
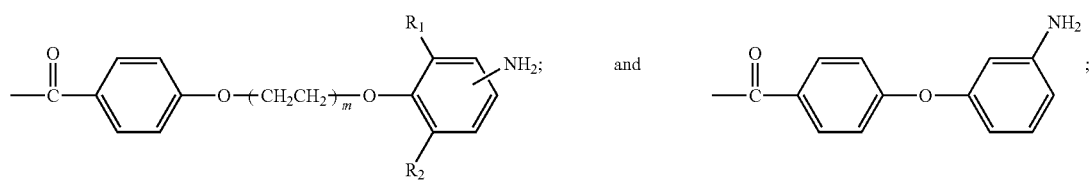

where $R_1$ and $R_2$ can be the same or different and are selected from the group consisting of hydrogen and $C_{1-4}$ alkyl; m ranges from 6 to 14; and n ranges from 2 to 50.

In some exemplary embodiments, the composition further comprises at least one polymer with some embodiments including polyimide polymers. In some exemplary embodiments, the composition comprises a nanocomposite with some embodiments including a film, a fibrous material, a polyimide film, or a polyimide fibrous material. In some exemplary embodiments, the carbon nanofibers are vapor grown carbon nanofibers. In some exemplary embodiments, the percent of CNF functionalization is selected from the group consisting of 0.5%, 2.5%, 5.0%, and 7.5%.

In another exemplary embodiment, the invention is a method for producing functionalized carbon nanofibers comprising: providing carbon nanofibers; providing a first reactant selected from the group consisting of

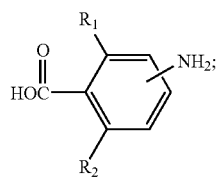

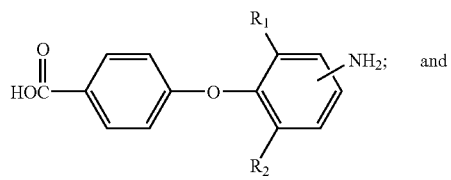

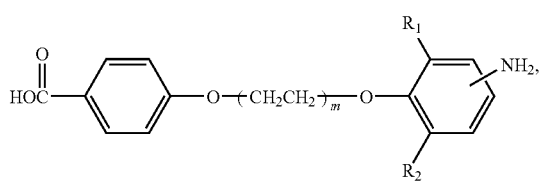

wherein $R_1$ and $R_2$ can be the same or different and are selected from the group consisting of hydrogen and $C_{1-4}$ alkyl, and m ranges from 1 to 20; reacting the first reactant with the carbon nanofibers to produce a first reaction product; and recovering the functionalized carbon nanofibers from the first reaction product. In some exemplary embodiments, the carbon nanofibers are vapor grown carbon nanofibers. In some exemplary embodiments, the first reactant is 3-aminophenoxy-4-benzoic acid.

In another exemplary embodiment, the invention is a method for producing functionalized carbon nanofibers comprising: providing carbon nanofibers; providing a first reactant selected from the group consisting of

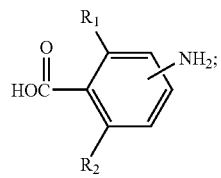

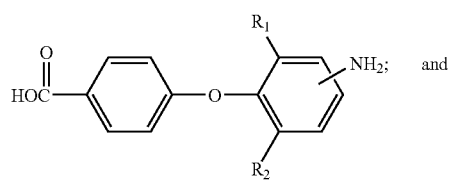

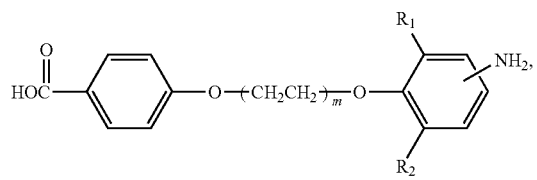

wherein $R_1$ and $R_2$ can be the same or different and are selected from the group consisting of hydrogen and $C_{1-4}$ alkyl, and m ranges from 1 to 20; reacting the first reactant with the carbon nanofibers to produce a first reaction product; reacting 2,2-bis(phthalic anhydride)-1,1,1,3,3,3-hexafluoroisopropane and 1,3-bis(3-aminophenoxy)benzene to produce a poly(amic acid); reacting the first reaction product with the poly(amic acid) to produce a second reaction product; and recovering the functionalized carbon nanofibers from the second reaction product. In some exemplary embodiments, the first reactant is 3-aminophenoxy-4-benzoic acid. In some exemplary embodiments, the carbon nanofibers are vapor grown carbon nanofibers. In some exemplary embodiments, reacting 2,2-bis(phthalic anhydride)-1,1,1,3,3,3-hexafluoroisopropane and 1,3-bis(3-aminophenoxy)benzene to produce a poly(amic acid) is performed in-situ. In some exemplary embodiments, the at least one moiety is selected from the group consisting of

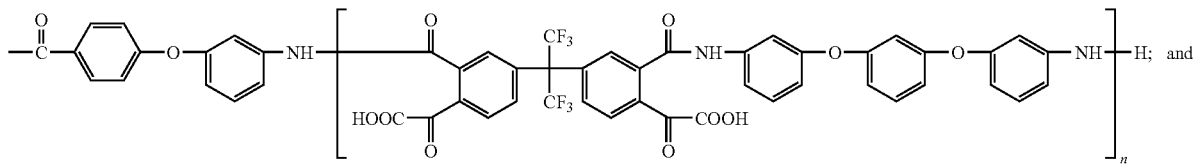

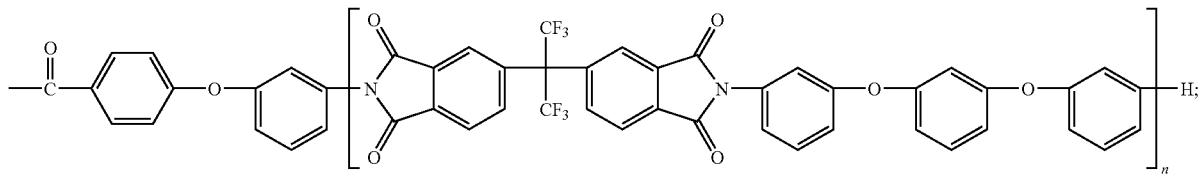

wherein n ranges from 2 to 50.

In another exemplary embodiment, the invention is a method for producing a nanocomposite comprising functionalized carbon nanofibers comprising: providing carbon nanofibers; providing a first reactant selected from the group consisting of

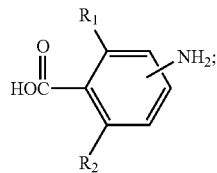

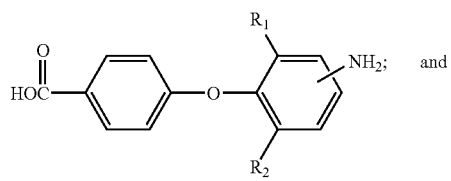

and

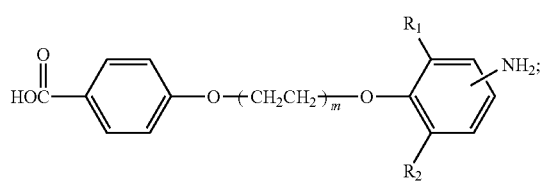

wherein $R_1$ and $R_2$ can be the same or different and are selected from the group consisting of hydrogen and $C_{1-4}$ alkyl, and m ranges from 1 to 20; reacting the first reactant with the carbon nanofibers to produce a first reaction product; reacting 2,2-bis(phthalic anhydride)-1,1,1,3,3,3-hexafluoroisopropane and 1,3-bis(3-aminophenoxy)benzene to produce a poly(amic acid); reacting the first reaction product with the poly(amic acid) to produce a second reaction product; treating the second reaction product to produce a third reaction product; optionally heating the third reaction product to produce a fourth reaction product; and recovering the nanocomposite comprising functionalized carbon nanofibers from the third reaction product or the fourth reaction product. In some exemplary embodiments, the first reactant is 3-aminophenoxy-4-benzoic acid. In some exemplary embodiments, the step of treating the second reaction product to produce a third reaction product occurs by chemical imidization, thermal imidization, or both. In some exemplary embodiments, the nanocomposite is a film or a fibrous material. In some exemplary embodiments, the carbon nanofibers are vapor grown carbon nanofibers. In some exemplary embodiments, reacting 2,2-bis(phthalic anhydride)-1,1,1,3,3,3-hexafluoroisopropane and 1,3-bis(3-aminophenoxy)benzene to produce a poly(amic acid) is performed in-situ. In some exemplary embodiments, heating the third reaction product to produce a fourth reaction product is required. In some exemplary embodiments, heating the third reaction product to produce a fourth reaction product is performed at a pressure less than or equal to atmospheric pressure. In some exemplary embodiments, the at least one moiety is selected from the group consisting of

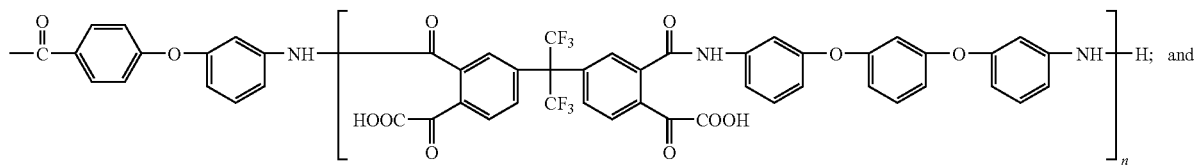

and

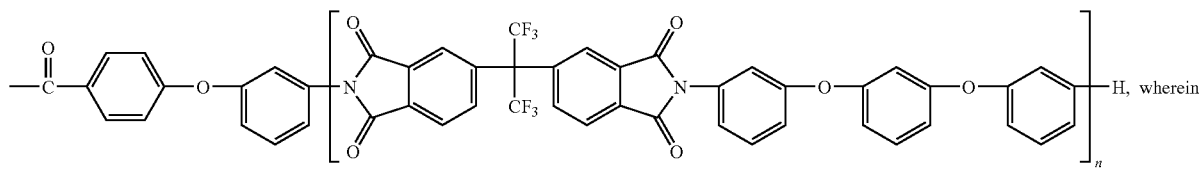

wherein n ranges from 2 to 50.

In another exemplary embodiment, the invention is a device which is used at least to measure temperature comprising a composition comprising carbon nanofibers functionalized with at least one moiety wherein the at least one moiety comprises at least one bivalent radical selected from the group consisting of

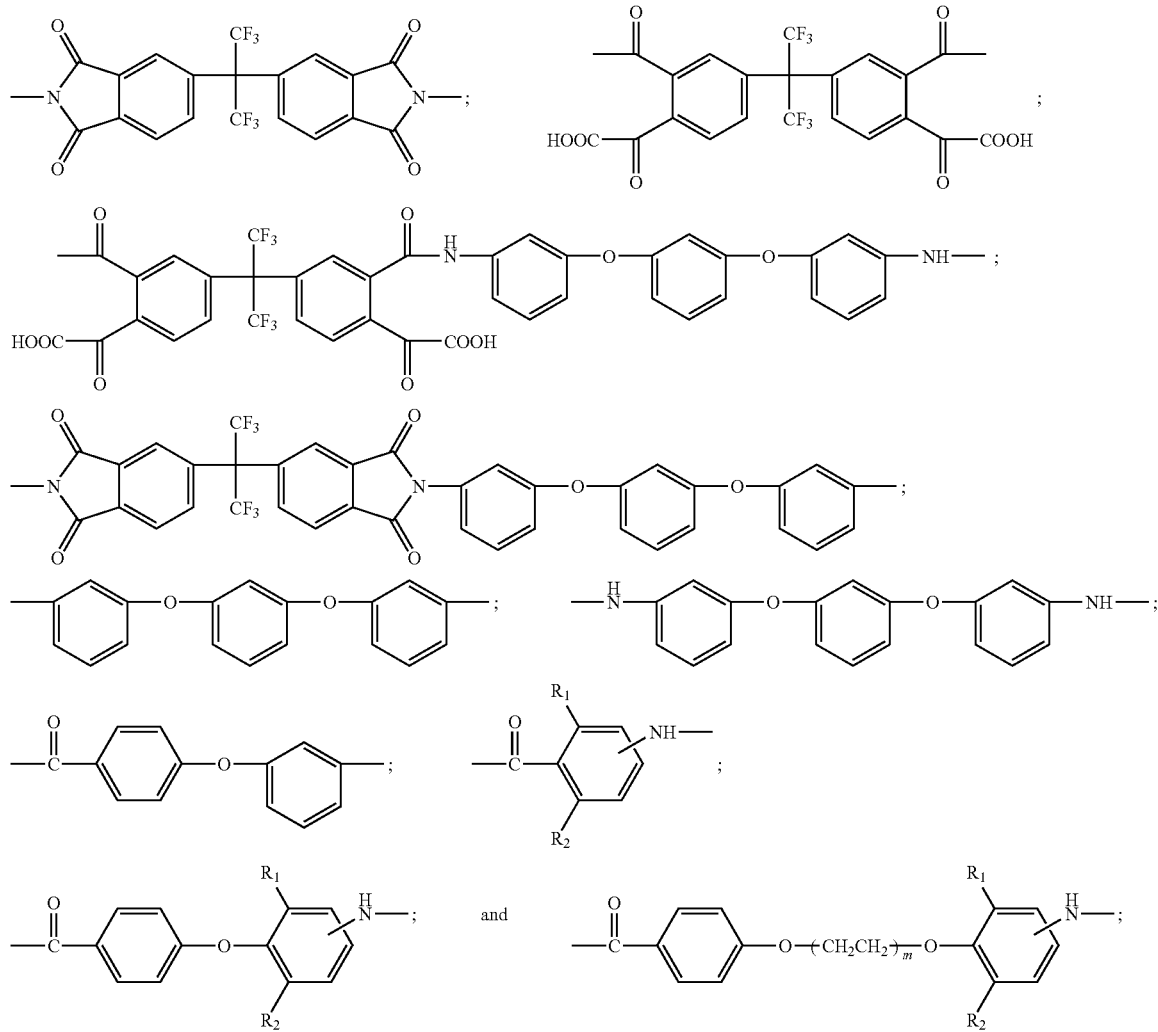

wherein $R_1$ and $R_2$ can be the same or different and are selected from the group consisting of hydrogen and $C_{1-4}$ alkyl; and m ranges from 1 to 20. In some exemplary embodiments, the composition is a polyimide film having temperature-dependent resistivity.

Accordingly, it is a feature of the invention to provide a composition and method of making functionalized carbon nanofibers and nanocomposites. Other features of the present invention will be apparent in light of the description of the invention embodied herein.

BRIEF DESCRIPTION OF THE DRAWINGS

The following detailed description of specific embodiments of the present invention can be best understood when read in conjunction with the following drawings.

DETAILED DESCRIPTION OF THE EMBODIMENTS

Figure 1:
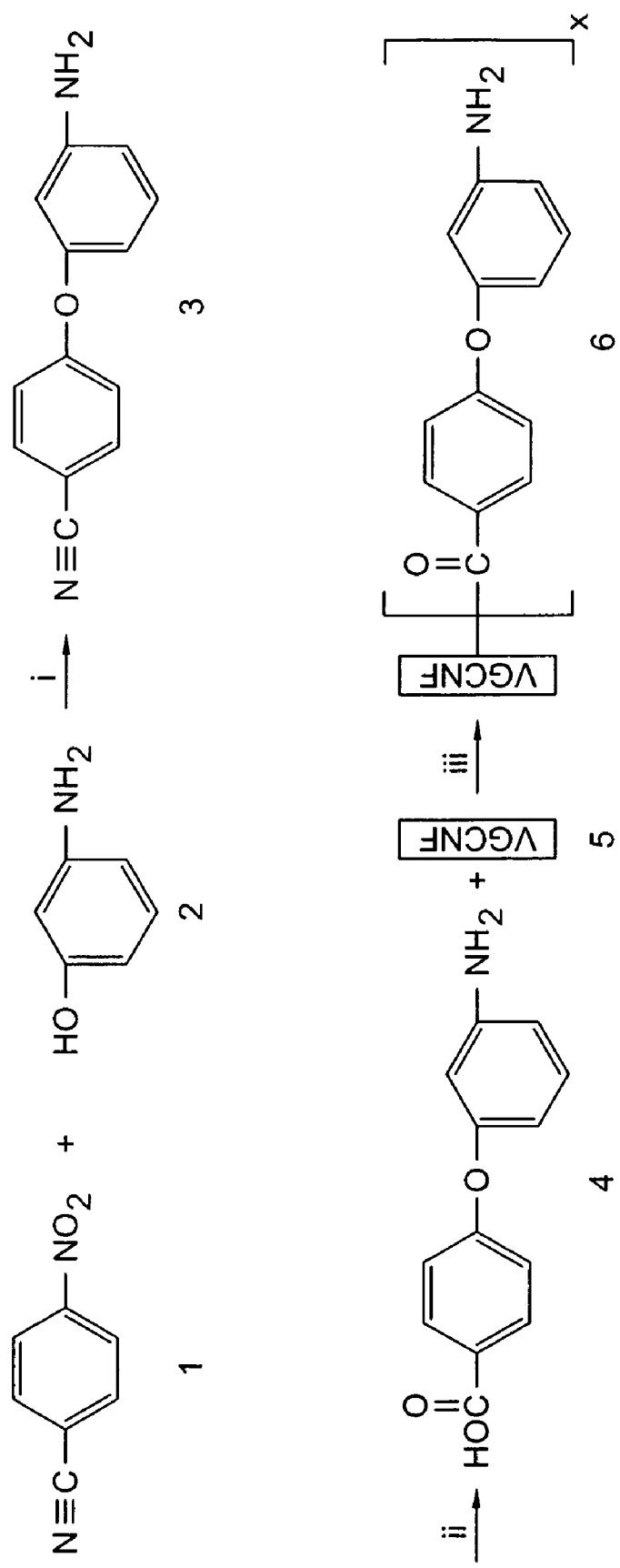
FIG. 1 illustrates the functionalization of VGCNF with 3-aminophenoxy-4-benzoic acid using the following reaction conditions: (i) NMP, $K_2CO_3$, 160° C., 6 hours; (ii) PPA, $H_2O$, 120° C., 8 hours; and (iii) VGCNF, $P_2O_5$/PPA, 130° C., 3 days.

It is noted that terms like "preferably," "commonly," and "typically" are not used herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

It is further noted that use of the terms "first," "second," "third," and "fourth" are not used herein to indicate a required order and are not meant to imply that a process step or product, for example, cannot be interposed between them. The terms are used for antecedent bases and are to be interpreted as "first-identified," "second-identified" etc. . . . . .

CNF, as used herein, is defined to include all varieties of carbon nanofibers, including all types of internal and external structures. Examples of internal structures include, but are not limited to, arrangement of the graphene layers as concentric cylinders, stacked coins, segmented structures, and nested truncated cones. Examples of external structure include, but are not limited to, kinked and branched structures, amount and extent of surface rugosity, diameter variation, nanohorns, and nanocones.

CNFs also include structures that have a hollow interior and those that do not. The hollow core, if it exists, can have a diameter of 20 and above, or 20-490 nm, or 30-190 nm, or 50-190 nm, or 50-90 nm. CNFs can have an outer diameter dimension of 30 nm and above, or 30-500 nm, or 40-200 nm, or 60-200 nm, or 60-100 nm. Aspect ratios for CNFs can be 500 and above, or 800 and above, or 1000 and above.

There are many methods used to make CNFs. For example, non-hollow CNFs can be made using electrospinning from polyacrylonitrile and meso-phase pitch precursors. One class of methods for making hollow CNFs is vapor growth. Vapor grown carbon nanofibers (VGCNF) can be produced, for example, by a vapor-phase catalytic process in which a carbon-containing feedstock (e.g., $CH_4$, $C_2H_4$, etc . . . ) is pyrolyzed in the presence of small metal catalyst (e.g., ferrocene, $Fe(CO)_5$, etc.). Exemplary dimensions of VGCNFs include an outer diameter of 60-200 nm, a hollow core of 30-90 nm, and a length on the order of 50-100 μm.

The functionalized CNFs can include those functionalized with at least one of the following bivalent radicals:

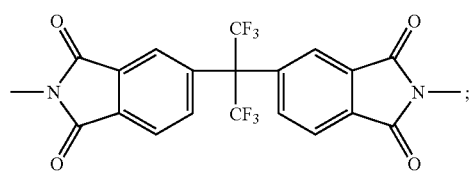

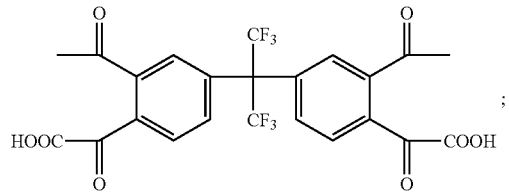

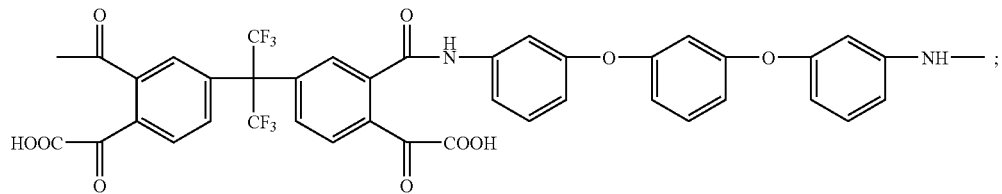

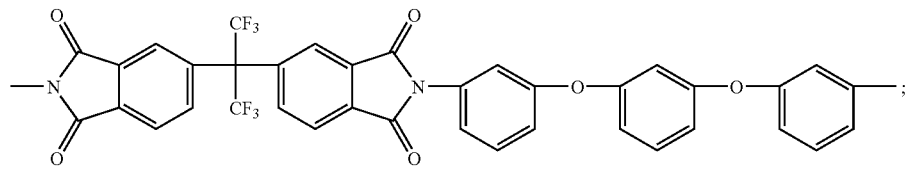

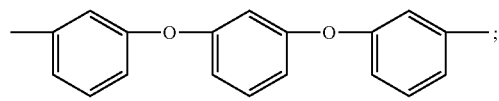

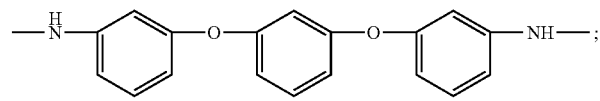

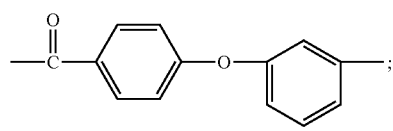

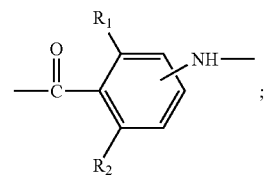

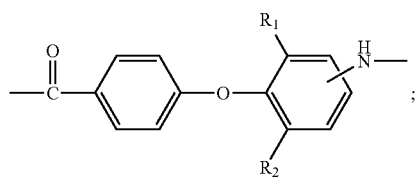
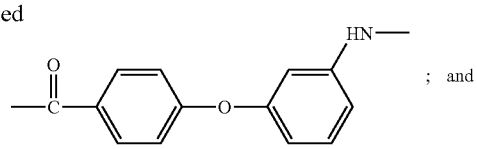
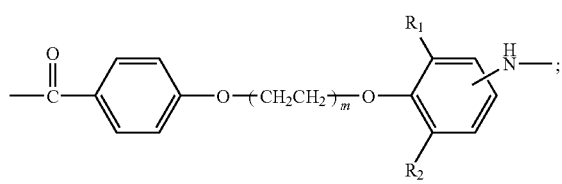
where $R_1$ and $R_2$ can be the same or different and are selected from the group consisting of hydrogen and $C_{1-4}$ alkyl; and m can range from 1 to 20 or from 6 to 14.
The functionalized CNFs can include those functionalized with at least one of the following moieties:
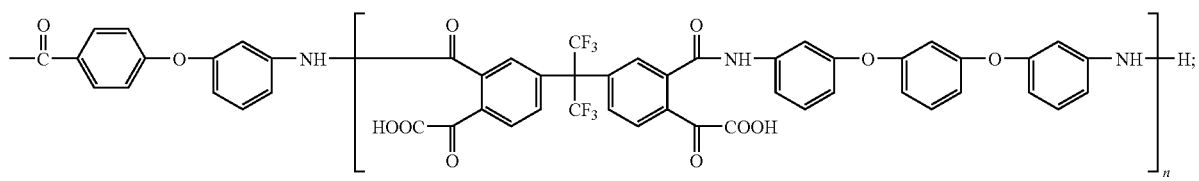
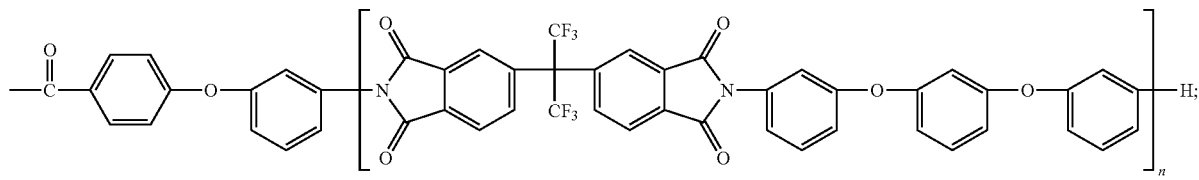
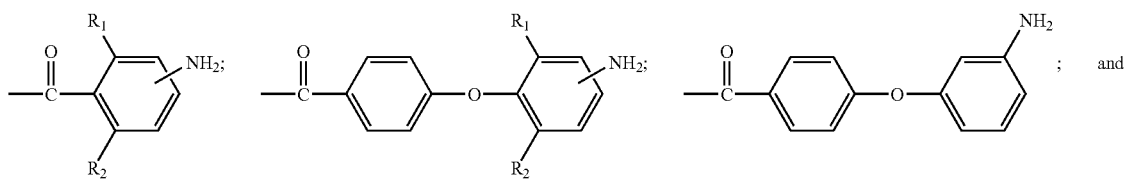
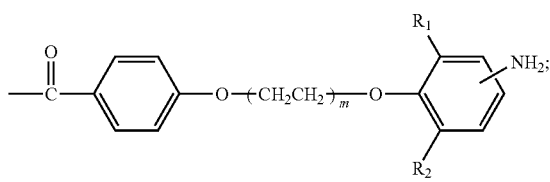

where $R_1$ and $R_2$ can be the same or different and are selected from the group consisting of hydrogen and $C_{1-4}$ alkyl (such as methyl); and m can range from 1 to 20 or from 6 to 14.

The value of n can, for example, range from 2 to 200, or 2 to 50, or 2 to 16 or can be 2, 3, 4, 5, 6, 7, 8, 9, 16, 25, 50, 100, or 200, for example.

The percent of CNF functionalization (i.e., the percent of CNF carbons functionalized by moieties) can be, for example, 0.001%, 0.01%, 0.05%, 0.5%, 2.5%, 5.0%, 7.5% and any extent less than 10.0%.

In another exemplary embodiment, the invention is a method for producing functionalized CNFs comprising reacting CNFs with a compound such as

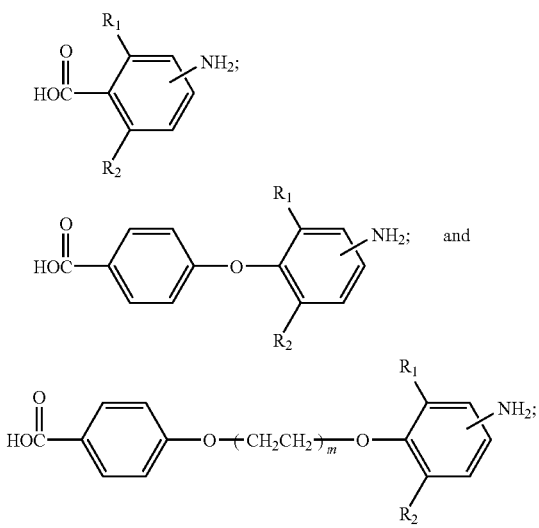

where $R_1$ and $R_2$ can be the same or different and are selected from the group consisting of hydrogen and $C_{1-4}$ alkyl; and m can range from 1 to 20 or from 6 to 14. In some exemplary embodiments, the compound is 3-aminophenoxy-4-benzoic acid. The reaction can occur in the presence of one or more compounds such as poly(phosphoric acid), methyl sulphonic acid, and phosphorous pentoxide. The functionalization can occur through many types of reactions including, for example, arylcarbonylation and Friedel-Crafts acylation. The functionalized CNFs can be recovered from the product of the above reaction.

In another exemplary embodiment, the invention is a method for producing functionalized CNFs by: providing CNFs; providing a first reactant which can be selected from the group consisting of

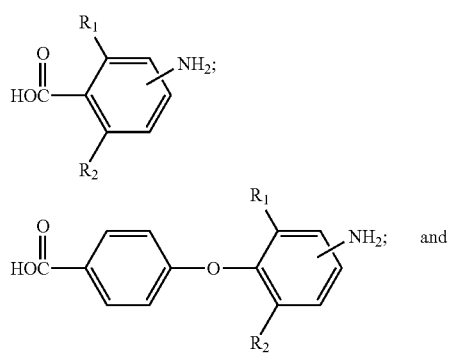

-continued

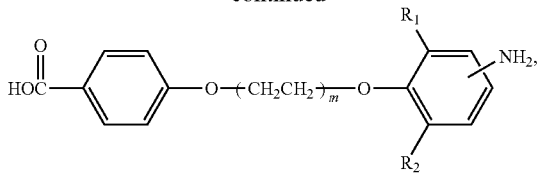

where $R_1$ and $R_2$ can be the same or different and are selected from the group consisting of hydrogen and $C_{1-4}$ alkyl, and m can range from 1 to 20 or from 6 to 14; reacting the first reaction with the CNFs to produce a first reaction product; producing a poly(amic acid) (PAA) by, for example, reacting 2,2-bis(phthalic anhydride)-1,1,1,3,3,3-hexafluoroisopropane (6FDA) and 1,3-bis(3-aminophenoxy)benzene (BAPB); reacting the first reaction product with the PAA to produce a second reaction product; and recovering the functionalized CNFs from the second reaction product. In some exemplary embodiments, the first reactant is 3-aminophenoxy-4-benzoic acid. The reacting of 6FDA and BAPB can occur either in-situ or not. The first reaction product can be, for example, CNF which is functionalized with a compound having an amine. The reaction to produce the second reaction product or to produce the third reaction product can occur in the presence of compounds such as aprotic solvents, dimethyl acetamide (DMAc), N-methyl pyrrolidone, N,N-dimethyl formamide (DMF), and dimethyl sulfoxide (DMSO).

In another exemplary embodiment, functionalized CNFs can be treated to form nanocomposites including, for example, fibrous materials and films. The nanocomposites can comprise functionalized CNFs at concentrations including, for example, 0.05%, 0.1%, 1%, 2%, 5%, 10%, and any percentage less than 25%. The treating of the functionalized CNFs can include one or more of, for example, heat or thermal treatments, chemical treatments, radiation treatments, imidization, purification, isolation, and extraction. The imidization can occur chemically or thermally. The imidization can occur in the presence of compounds such as acetic anhydride, triethylamine, dimethyl acetamide, pyridine, tertiary amines, ethyl quinoline, and toluene. The imidization can be catalyzed, for example, by including catalytic compounds. For example, chemical imizidation can occur between ABA-g-VGCNF and PAA to produce a fibrous material.

Thermal imidization can occur by heat treatment at or below atmospheric pressure. The imidization heat treatment can comprise one, two, three, four, five, six, or more heat treatment periods. The amount of time for an imidization heat treatment period can include, for example, times of 0.5 hours, 1 hour, 2 hours, 4 hours, 10 hours, 12 hours, 24 hours, 36 hours and any period of time less than 48 hours. Temperatures used during the imidization heat treatment periods can include, for example, room temperature, 37° C., 100° C., 150° C., 200° C., 225° C., and any temperature less than 250° C. An imidization heat treatment period can also include temperature increases or decreases that can occur at a fixed or variable rate during a period of time. Thermal imidization can include the use of reduced pressure. One or more reduced pressures can be applied to one or more imidization heat treatment periods and can be obtained, for example, using a house-supplied vacuum, a mechanical vacuum pump, or a turbo vacuum pump. Exemplary pressures include $10^{-10}$ torr, $10^{-4}$ torr, 4 torr, 60 torr, 380 torr, and any pressure below atmospheric pressure.

In addition to the aforementioned treatments, functionalized CNFs can be further subjected to heating at a pressure equal to or less than atmospheric pressure. The heating can be a heat treatment that can comprise one, two, three, four, five, six, or more heat treatment periods. The amount of time for a heat treatment period can include, for example, times of 0.5 hours, 1 hour, 2 hours, 4 hours, 10 hours, 12 hours, 24 hours, 36 hours, and any period of time less than 48 hours. Temperatures used during the heat treatment periods can include, for example, room temperature, 37° C., 100° C., 150° C., 200° C., 225° C., 250° C., 280° C., 350° C., and any temperature less than 475° C. A heat treatment period can also include temperature increases or decreases that can occur at a fixed or variable rate during a period of time. One or more pressures can be applied to one or more heat treatment periods and can be obtained, for example, using a house-supplied vacuum, a mechanical vacuum pump, or a turbo vacuum pump. Exemplary pressures include $10^{-10}$ torr, $10^{-4}$ torr, 4 torr, 60 torr, 380 torr, and any pressure below atmospheric pressure.

The process for recovering the products from the methods described herein can include one or more recovery steps. Such recovery steps can include, for example, purifying, isolating, decanting, pouring, transferring, pipetting, filtering, extracting, cutting, scraping, peeling, scooping, heating, radiating, distilling, casting, diluting, precipitating, chemically modifying, and other processes needed to provide the desired product.

In order that the invention may be more readily understood, reference is made to the following examples which are intended to illustrate the invention, but not limit the scope thereof.

Example 1

Synthesis of 4-(3-Aminophenoxy)benzonitrile (3)

Into a 250 ml three-necked flask equipped with a magnetic stirrer, a Dean-Stark trap, a nitrogen inlet and outlet, 4-nitrobenzonitrile (7.41 g, 50.0 mmol), 3-aminophenol (5.46 g, 50 mmol), potassium carbonate (8.28 g, 60.0 mmol), NMP (100 mL), and toluene (50 mL) were charged and stirred with dried nitrogen purging at 160° C. for 6 hours. The mixture was allowed to cool to room temperature and filtered. The filtrate was poured into water. The white solid was collected by filtration and dried. It was dissolved in acetone and precipitated into water to afford 8.18 g of white solid (78%), m.p. 88-90° C. (Literature m.p. 84-88° C.). Anal. Calcd. for $C_{13}H_{10}N_2O$: C, 74.27%; H, 4.79%; N, 13.32%. Found: C, 74.09%; H, 4.86%; N, 13.35%. FT-IR (KBr, cm$^{-1}$): 3486, 3392 (NH$_2$), 2218 (nitrile), 1629(carbonyl). Mass spectrum (m/e): 210 (M$^+$). $^1$H-NMR (DMSO-d$_6$, 6 in ppm): 5.38 (s, 2H, NH$_2$), 6.22-6.25 (dd, 1H, Ar—H), 6.30-6.32 (t, 1H, Ar—H), 6.46-6.50 (dd, 1H, Ar—H), 7.06-7.12 (m, 3H, Ar—H) and 7.80-7.83 (d, 2H, Ar—H). $^{13}$C-NMR (DMSO-d$_6$, 6 in ppm): 104.59, 105.05, 106.90, 110.83, 117.91, 118.86, 130.48, 134.48, 150.89, 155.37, 161.44.

Example 2

Synthesis of 4-(3-Aminophenoxy)benzoic acid (4)

Into a 100 ml three-necked flask equipped with a magnetic stirrer, a nitrogen inlet and outlet, 4-(3-aminophenoxy)benzonitrile (5.00 g, 24.0 mmol), polyphosphoric acid (30.0 g), and water (5.30 g, 60.0 mmol) were charged and stirred with dried nitrogen purging at 120° C. for 8 hours. The mixture was poured into water and the yellow solid was collected by filtration. It was recrystallized in water/ethanol (50:50) mixture to afford 4.50 g of yellow crystals (83%), m.p. 145-147° C. (Literature m.p. 145-147° C.). Anal. Calcd. for $C_{13}H_{10}N_2O$: C, 68.11%; H, 4.84%; N, 6.11%. Found: C, 68.36%; H, 4.90%; N, 6.23%. FT-IR (KBr, cm$^{-1}$): 3454, 3366 (NH$_2$), 2500-3500 (broad, COOH), 1661 (carbonyl). Mass spectrum (m/e): 229 (M$^+$). $^1$H-NMR (DMSO-d$_6$, δ in ppm): 6.21-6.24 (dd, 1H, Ar—H), 6.27-6.28 (t, 1H, Ar—H), 6.41-6.45 (dd, 1H, Ar—H), 6.99-7.09 (m, 3H, Ar—H) and 7.92-7.95 (d, 2H, Ar—H). $^{13}$C-NMR (DMSO-d$_6$, 6 in ppm): 104.81, 106.74, 110.32, 117.14, 124.68, 130.23, 131.44, 150.47, 155.74, 161.18, 166.71.

Example 3

Functionalization of VGCNF with 3-aminophenoxy-4-benzoic acid (6, ABA-g-VGCNF)

Into a 250 mL resin flask equipped with a high torque mechanical stirrer, and nitrogen inlet and outlet, 3-aminophenoxy-4-benzoic acid (0.50 g, 2.18 mmol) and VGCNF (0.50 g) poly(phosphoric acid) (PPA, 20 g), and phosphorus pentoxide (P$_2$O$_5$, 5.0 g) were charged and stirred with dried nitrogen purging at 130° C. for 72 hours. After cooling down to room temperature, water was added. The resulting precipitate was collected, washed with diluted ammonium hydroxide, and Soxhlet extracted with water for three days and methanol for three days. It was then dried over P$_2$O$_5$ under reduced pressure for 72 hours to afford 0.80 g (83% yield) of dark brown solid. Anal. Calcd. For $C_{155}H_{50}N_5O_{10}$ (based on the assumption that for every 100 carbon, there are 5 3-aminophenoxy-4-benzoyl groups attached): C, 86.92%; H, 2.10%; N, 3.27%. Found: C, 87.11%; H, 2.33%; N, 3.43%. FT-IR (KBr, cm$^{-1}$): 1629 (carbonyl).

Example 4

In-Situ Polymerization (PI with 1 wt % VGCNF Load)

Into a 50 mL three necked flask equipped with a magnetic stirrer, nitrogen inlet and outlet, ABA-g-VGCNF (6, 45.0 mg) and DMAc (20 mL) were placed and sonicated for 30 min until the ABA-g-VGCNF was dispersed in DMAc homogenously. 6FDA (7, 1.777 g, 4.0 mmol) was added and stirred under dry nitrogen at room temperature for 30 min. Then BAPB (8, 1.158 g, 3.96 mmol) was charged. The dark mixture was agitated at room temperature for 24 hours to afford a viscous poly(amic acid) (PAA). The resulting PAA was imidized by either chemical cyclodehydration or thermal method. (i) Chemical imidization: Acetic anhydride (12 mL) and triethylamine (8 mL) were added to PAA mixture for 24 hours. The resulting PI was precipitated into methanol to afford 2.7 g (95%) of grey fibers. (ii) Thermal imidization: The PAA mixture was diluted with DMAc (20 mL), cast in film, and then subjected to vacuum evaporation and heat treatment at 100° C./24 hours; 150° C./4 hours; 200° C./2 hours and 250° C./1 hour. This produced compound (10) in a film with thickness of about 0.1 mm. FT-IR (KBr, cm$^{-1}$): 1729, 1785 (imide).

Example 5

Synthesis and Characterization of ABA-g-VGCNF

Figure 5:
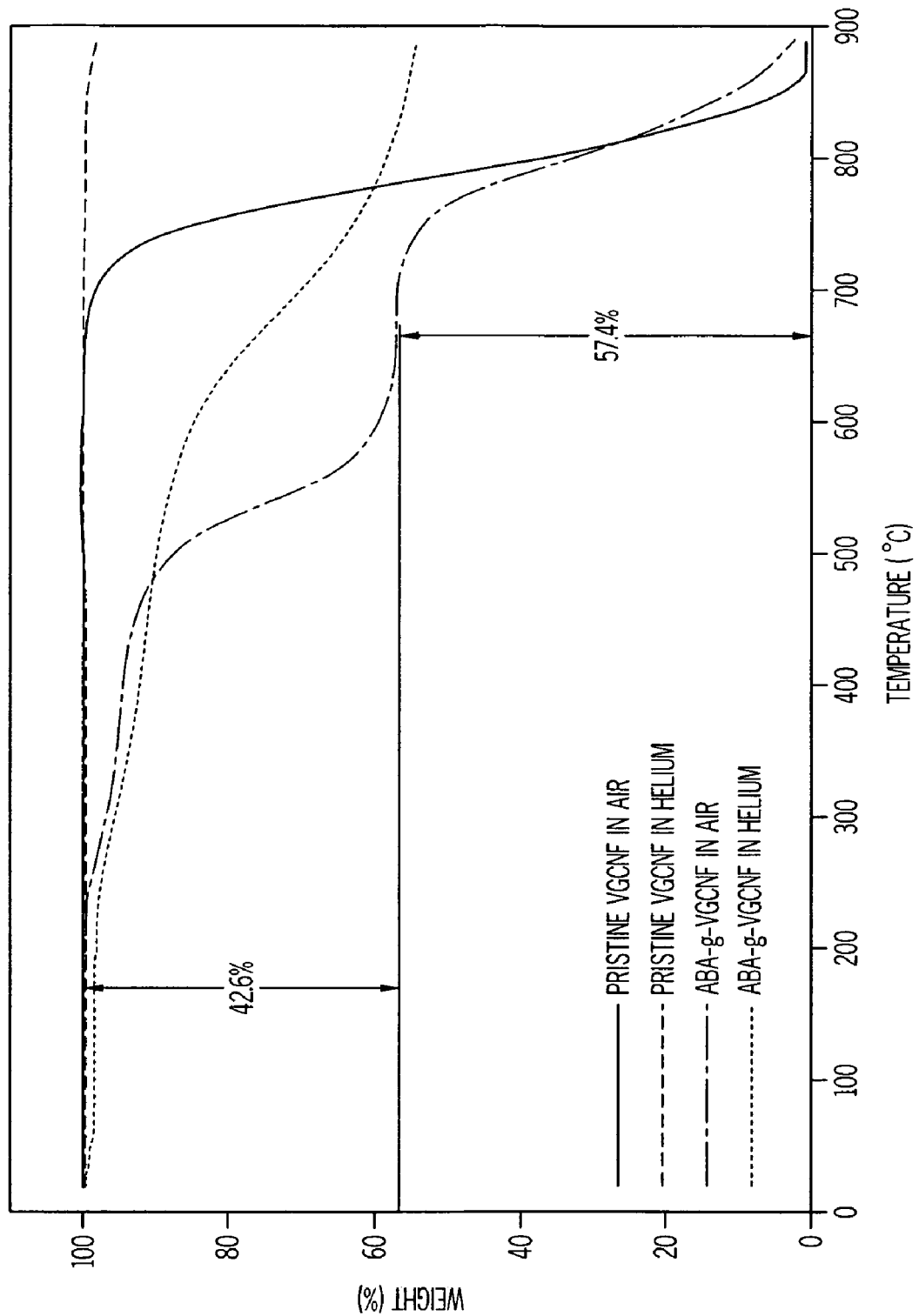
FIG. 5 is a graph illustrating the Thermogravimetric Analysis (TGA) thermograms of pristine VGCNF and ABA-g-VGCNF; both thermograms used a heating rate of 10° C./minute.

3-Aminophenoxy-4-benzoic acid was prepared using a two-step synthetic route (FIG. 1). The nucleophilic substitution of 4-nitrobenzonitrile (1) with 3-aminophenol (2) in the presence of potassium carbonate yielded 3-aminophenoxy-4-benzonitrilesequence (3), which was subsequently hydrolyzed to 3-aminophenoxy-4-benzoic acid (4) in 100% of phosphoric acid. VGCNF was functionalized with amine-groups on the surface by reacting itself with compound (4), at 130° C. in PPA/$P_2O_5$ via Friedel-Crafts acylation (FIG. 1). The FT-IR spectra of compounds (4) and (6) showed that the carboxylic acid bands (one at 1651 $cm^{-1}$ and a broad band at 2500-3500 $cm^{-1}$) disappeared and the new aromatic ketone band at 1629 $cm^{-1}$ appeared after the acylation completed. These band changes indicated grafting. Scanning electron microscopy (SEM) revealed that the original VGCNF had smooth surface, but the surfaces of functionalized VGCNF were clearly coated with covalently bonded moieties. The pristine VGCNF showed excellent thermal stability in both air and helium. The ABA-g-VGCNF started to lose weight at 247° C. in air and 243° C. in helium, as expected, due to the decomposition of the amine-containing groups. Based on TGA and element analysis results (Table 1 and FIG. 5), we concluded there were 5 arylcarbonyl groups covalently attached to the nanofiber structure for every 100 carbon sites (i.e., 5% CNF functionalization).

TABLE 1

Element analysis data for pristine and functionalized VGCNF.

| Sample | Elemental Analysis | C (%) | H (%) | N (%) | O (%) |
| --- | --- | --- | --- | --- | --- |
| Pristine VGCNF | Theoretically Calculated | 100 | 0 | 0 | 0 |
| | Experimentally Found | 99.02 | 1.01 | <0.20 | <0.10 |
| ABA-g-VGCNF | Theoretically Calculated | 86.92 | 2.10 | 3.27 | 7.71 |
| | Experimentally Found | 87.11 | 2.33 | 3.43 | 6.40 |

Example 6

Polymerization and Characterization (CP2-g-VGCNF)

Figure 2:
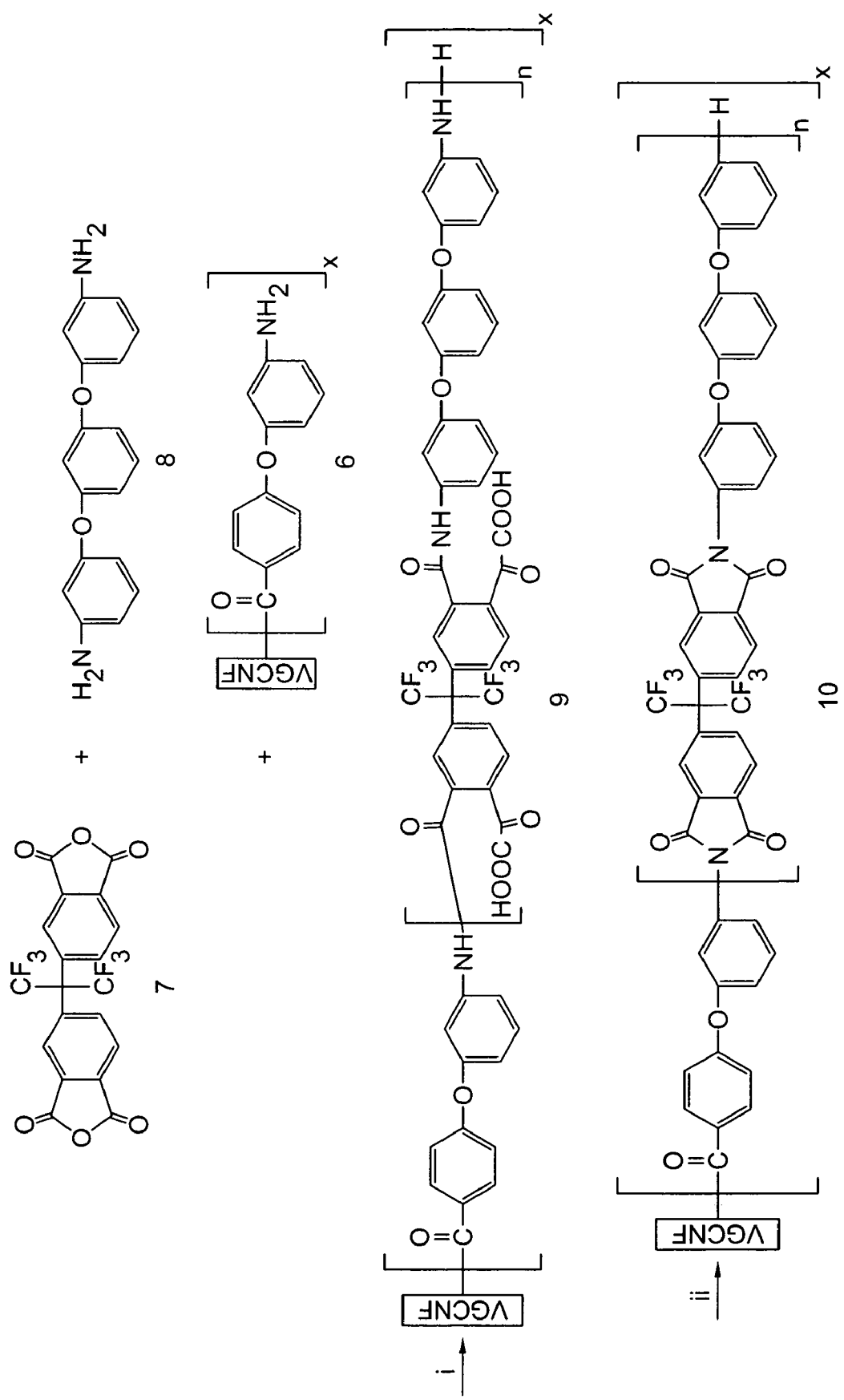
FIG. 2 illustrates the synthesis of CP2-g-VGCNF nanocomposites via in-situ polymerization of 6FDA (7), BAPB (8), and ABA-g-VGCNF (6) using the following reaction conditions: (i) DMAc, room temperature and (ii) 100° C., 24 hours; 150° C., 4 hours; 200° C., 4 hours; 280° C., 1 hour.
Figure 3:
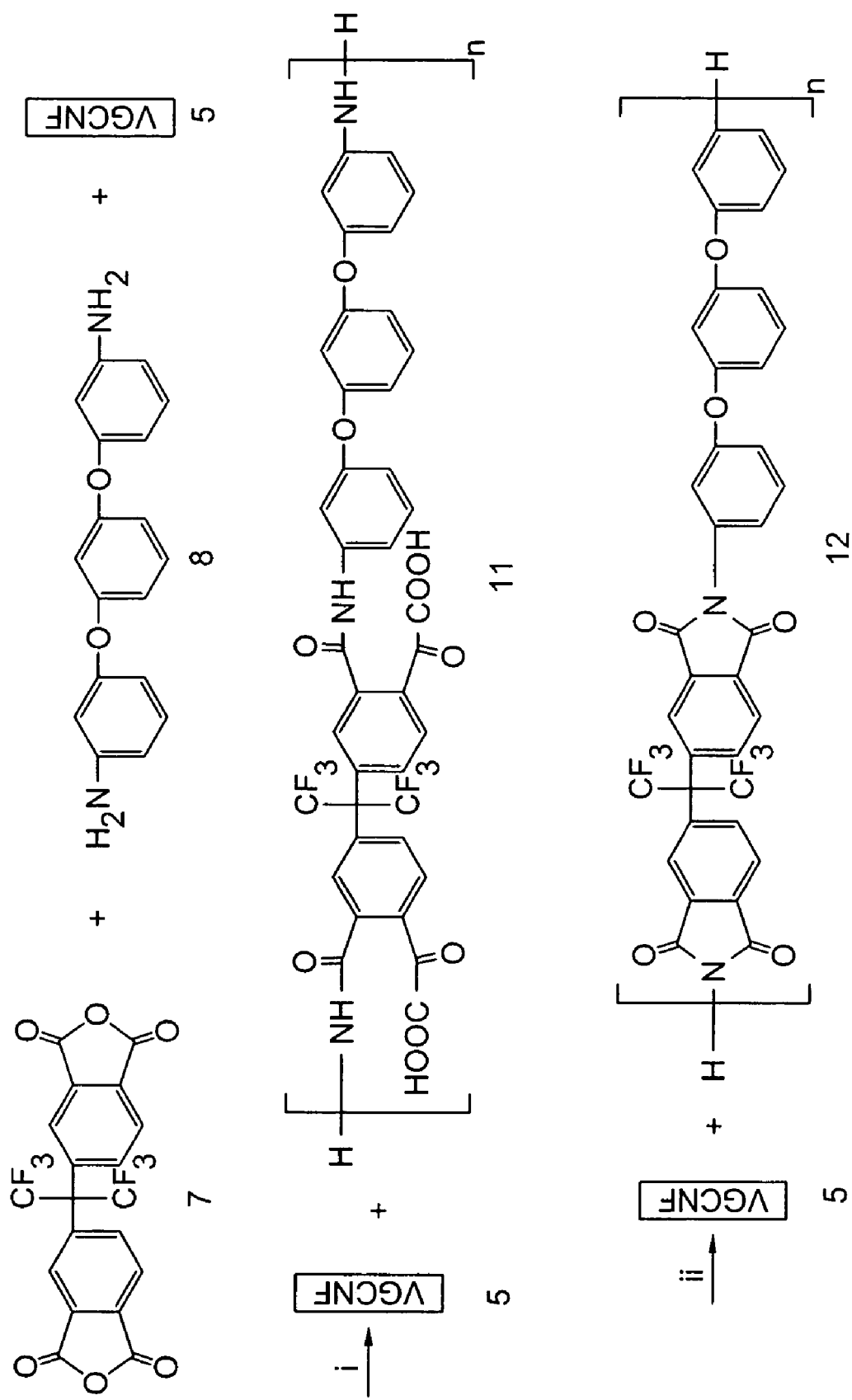
FIG. 3 illustrates the synthesis of VGCNF/CP2 blends via in-situ polymerization of 6FDA (7), BAPB (8), and pristine VGCNF (5) using the following reaction conditions: (i) DMAc, room temperature, 24 hour and (ii) 100° C., 24 hours; 150° C., 4 hours; 200° C., 4 hours; 280° C., 1 hour.
Figure 4:
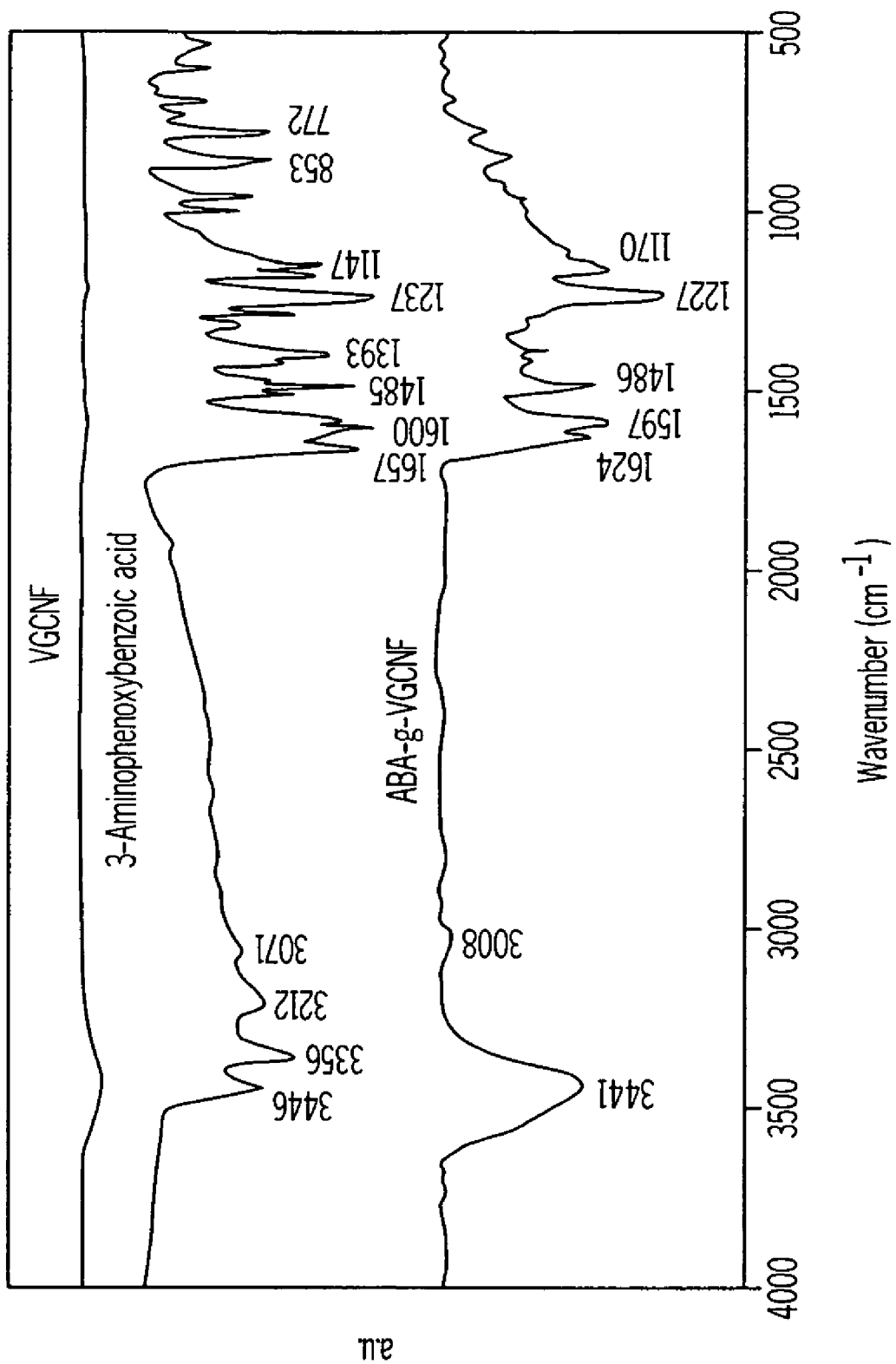
FIG. 4 is a graph illustrating the FT-IR spectra of 3-aminophenoxy-4-benzoic acid (4) and ABA-g-VGCNF (6)

ABA-g-VGCNF (6) was polymerized with 6FDA (7) and BAPB (8) in DMAc at room temperature for 24 hours to afford compound (9), as shown in FIG. 2. The viscous solution was diluted and poured into a dish. It was treated at elevated temperature to first produce compound (10) and then to afford a polyimide (CP2) film as shown in FIG. 2. The VGCNF contents were varied from 0, 0.1, 1, 2, and 5%, respectively. For comparison purpose, pristine VGCNF was also added into PAA solution and treated with the same method as mentioned above (as shown in FIG. 3). The pristine VGCNF contents were 0.1 wt %.

The dispersion of CP2-g-VGCNF (0.1 wt %) in polyimide films was more uniform than 0.1 wt % of the pristine VGCNF. The viscosities and thermal properties of the polyimides are summarized in Table 2. The glass transition temperature of homopolymer was 199° C. The $T_g$ was increased to 201° C. after 0.1 wt % of VGCNF was added to the CP2 film. As the VGCNF content increased from 0.1 wt % to 5 wt %, the $T_g$s decreased from 201° C. to 196° C. This is possibly due to π-π interaction between the VGCNF surface and BAPB diamine, which results in a lower CP2 molecular weights. All polyimides exhibited excellent thermal stability with 5% weight loss temperature ranging from 525-530° C. in helium and 520-526° C. in air, respectively.

TABLE 2

Physical properties of CP2-g-VGCNF composites

| | | DSC | TGA | | | |
| --- | --- | --- | --- | --- | --- | --- |
| | | | in helium | | in air | |
| % VGCNF | [η] (dL/g) | Tg (° C.) | T5% (° C.) | Char (%) | T5% (° C.) | Char (%) |
| 0 | 0.42 | 199 | 530 | 56.5 | 526 | 1.14 |
| 0.1 | 0.65 | 201 | 528 | 52.9 | 526 | 0.33 |
| 1 | 1.12 | 199 | 529 | 56.4 | 525 | 0.55 |
| 2 | 1.37 | 197 | 525 | 56.5 | 520 | 0.51 |
| 5 | 1.43 | 196 | 526 | 53.6 | 520 | 1.26 |

In Table 2, the intrinsic viscosity ([η]) was measured in NMP at 30.0±0.1° C. $T_g$ is the inflection in baseline on the DSC thermogram obtained in $N_2$ with a heating rate of 10° C./min. T5% is the temperature at which 5% weight loss occurred on a TGA thermogram which was obtained with a heating rate of 10° C./min. The Char yield is determined at 850° C.

High resolution SEM was used to investigate the dispersion of the CNFs in CP2 polyimides. The SEM pictures showed that the nanofibers were well dispersed in the polyimide matrix. Enlargement of the SEM picture showed an increase in the nanofiber diameter, indicating that it was coated with the polymers. The nanocomposites containing 1 wt % and 2 wt % also displayed good dispersion, according to SEM, although some fiber aggregations appeared as the nanofiber content increased. The SEM pictures also showed good adhesion between CP2 and nanofibers.

The polymer films were cut into 50×5 mm slices and an Instron was used to measure their tensile properties. As shown in Table 3, both the tensile strength and strain increased as VGCNF content increased from 0.1 to 5%, indicating the stiffness of polymer films increased with VGCNF content. The modulus increased from 3.3 to 4.8 GPa as the VGCNF content increased from 0 to 5% while the tensile strengths maintained constant. The cross sections of the thin films were investigated using HR-SEM. For all films tested, some nanofibers broke under the stress, (indicating good adhesion with the polymer) while others simply were pulled out and left holes in the CP2 polyimides (indicating poor adhesion between the fibers and polymer matrix).

TABLE 3

Thin film tensile properties of CP2-g-VGCNF

| % VGCNF | Tensile Strength (MPa) | Tensile Modulus (GPa) | Tensile Strain (%) |
| --- | --- | --- | --- |
| 0 | 116 ± 5 | 3.3 ± 0.2 | 6.3 ± 1.1 |
| 0.1 | 120 ± 11 | 3.5 ± 0.1 | 6.2 ± 0.5 |
| 1.0 | 131 ± 7 | 3.5 ± 0.2 | 6.2 ± 1.2 |
| 2.0 | 122 ± 5 | 3.7 ± 0.2 | 4.7 ± 0.6 |
| 5.0 | 124 ± 5 | 4.8 ± 0.4 | 5.9 ± 0.8 |

Since the CP2 homopolymer was soluble in THF and the CP2-g-VGCNF was insoluble in THF the nanocomposites were extracted continuously with THF until no free homopolymer was detected by thin layer chromatography (TLC). The insoluble portion was dried in an oven under a reduced pressure to afford a solid residue. The molecular weight was calculated based the percentage of the solid residue and the grafting sites. The soluble portion was concentrated and subjected to a Gel Permeation Chromatography (GPC) testing for molecular weights. The extracting results and molecular weights were listed in Table 4. The molecular weights obtained by GPC showed some fluctuations. The calculated molecular weights decreased as the VGCNF content increased.

TABLE 4

Molecular weights and molecular distributions of CP2-g-VGCNF

| VGCNF Content (wt %) | $M_n$ | $M_w$ | PDI | CP2-g-VGCNF Content (wt %) | MW/ chain | DP/ chain |
|---|---|---|---|---|---|---|
| 0 | 84,200 | 238,400 | 2.83 | 0 | — | — |
| 0.1 | 126,300 | 371,300 | 2.94 | 2.3 | 5,280 | 15.1 |
| 1.0 | 55,600 | 146,200 | 2.63 | 15.4 | 3,460 | 9.88 |
| 2.0 | 64,300 | 153,700 | 2.39 | 30.9 | 3,470 | 9.91 |
| 5.0 | 41,900 | 94,300 | 2.25 | 52.5 | 2,280 | 6.51 |

In Table 4, the number average molecular weights ($M_n$) and the weight average molecular distributions ($M_w$) of CP2 soluble in THF is measured by size-exclusion liquid chromatography in THF. PDI is the polydispersity index and is the ratio of $M_n$ to $M_w$. The weight percentage of CP2 grafted onto VGCNF is equal to insoluble weight percentage in THF minus VGCNF content.

MW/chain is the molecular weight of CP2 insoluble in THF calculated by the following equation:

$$MW/chain = \frac{CP2\text{-}g\text{-}VGCNF \text{ Content} - VGCNF \text{ Content}}{(VGCNF \text{ Content}/12)*0.05}$$

where 0.05 is fraction of functionalized sites on CP2-g-VGCNF (i.e., the percent of CNF functionalization is 5%), and 12 is carbon formula weight.

The degree of polymerization (DP)/chain is calculated as follows:

DP/chain=(MW/chain)/350.3 where 350.3 is the formula weight for the repeat unit $C_{19.5}H_4F_3NO_3$.

Example 7

Room Temperature Electrical Characterization

The DC conductivity, $\sigma_{DC}$, of PI/VGCNF and PI/CP2-g-VGCNF composite films was measured using a Novocontrol High Resolution Impedance Analyzer coupled to a Novotherm Thermal Control. Prior to the measurements 100 nm Au layers were thermally evaporated onto both sides of the samples using a Denton Explorer® 18 Cryo Auto High Vacuum Deposition System to the improve electrode-sample contacts. The deposited Au layers were 25 mm in diameter. The composite film thicknesses were measured using a digital caliper and ranged between 0.1-0.4 mm. Samples were then sandwiched between 20 mm diameter Au coated brass discs and placed in the instrument. AC impedance measurements were performed by applying a 1.0V potential across the sample, while sweeping through a frequency range of $10^{-2}$ Hz-$1.25 \times 10^6$ Hz at 25° C. The real part of the complex conductivity, $\sigma'$, was obtained as a function of frequency for pure PI and each composite series ranging in VGCNF and CP2-g-VGCNF loadings of 0.1-10 wt. %. The extrapolation of $\sigma'$ to 0 Hz yields the $\sigma_{DC}$ which was used to identify the insulator/conductor transitions. The $\sigma_{DC}$ values are given in Table 5.

TABLE 5

The $\sigma_{DC}$ as a function of filler wt. %.

| Weight % filler | $\sigma_{DC}$ (S/cm) PI/VGCNF | $\sigma_{DC}$ (S/cm) PI/CP2-g-VGCNF |
|---|---|---|
| 0 | $1.64 \times 10^{-16}$ | $1.64 \times 10^{-16}$ |
| 0.1 | $2.54 \times 10^{-16}$ | $5.01 \times 10^{-17}$ |
| 0.3 | $2.37 \times 10^{-16}$ | $2.37 \times 10^{-16}$ |
| 0.5 | $5.51 \times 10^{-7}$ | $4.13 \times 10^{-16}$ |
| 1 | $1.12 \times 10^{-5}$ | $7.88 \times 10^{-12}$ |
| 2 | $2.90 \times 10^{-4}$ | $1.89 \times 10^{-7}$ |
| 3 | $7.18 \times 10^{-3}$ | $1.83 \times 10^{-6}$ |
| 5 | $4.61 \times 10^{-2}$ | $1.21 \times 10^{-5}$ |
| 10 | $2.20 \times 10^{-1}$ | $3.73 \times 10^{-4}$ |

Example 8

Temperature-Dependent Conductivity Characterization of CP2-g-VGCNF Composites

Using the same procedure and samples in example 7, the $\sigma_{DC}$ was measured as a function of temperature for the 1, 5, and 10 wt. % PI/VGCNF and PI/CP2-g-VGCNF composites. The $\sigma_{DC}$ was measured at various temperatures ranging from 25° C. to 210° C. This measurement was repeated five times with the samples allowed to cool to 25° C. between measurements. The $\sigma_{DC}$ of each sample was obtained as a function of temperature and was converted to resistivity, $\rho$, by $\rho=1/\sigma_{DC}$. For each temperature the normalized change in resistivity was determined, given by $\Delta\rho_{norm}=\Delta\rho/\rho_o$, where $\rho_o$ is the resistivity at the initial starting temperature (25° C.), and $\Delta\rho$ is the resistivity change ($\Delta\rho=\rho-\rho_o$). The results for the first measurement of each sample mention in this section are listed in Table 6. The results for the $1^{st}$, $3^{rd}$, and $5^{th}$ measurements on the 5 wt % PI/VGCNF and 5 wt % PI/CP2-g-VGCNF are compared in Table 7.

TABLE 6

The normalized $\Delta\rho$ as a function of temperature for 1, 5, and 10 wt. % filler loadings

| | $\Delta\rho_{norm}$ | | | | | |
|---|---|---|---|---|---|---|
| ° C. | 10 wt % PI/ VGCNF | 5 wt % PI/ VGCNF | 1 wt % PI/ VGCNF | 10 wt % PI/CP2-g- VGCNF | 5 wt % PI/CP2-g- VGCNF | 1 wt % PI/CP2-g- VGCNF |
| 25 | 0.000 | 0.000 | 0.000 | 0.000 | 0.000 | 0.000 |
| 45 | −0.190 | −0.123 | 0.0210 | −0.0140 | 0.0149 | 0.0548 |
| 65 | −0.458 | −0.233 | 0.0520 | −0.0498 | 0.0465 | 0.0789 |
| 85 | −0.788 | −0.273 | 0.0940 | −0.0583 | 0.0973 | 0.116 |
| 105 | −1.06 | −0.306 | 0.122 | −0.0702 | 0.160 | 0.221 |
| 125 | −1.24 | −0.412 | 0.121 | −0.0707 | 0.234 | 0.237 |
| 145 | −1.54 | −0.467 | 0.154 | −0.0826 | 0.311 | 0.344 |
| 165 | −1.65 | −0.533 | 0.211 | −0.0765 | 0.390 | 0.387 |
| 185 | −1.44 | −0.708 | 0.278 | −0.0782 | 0.484 | 0.544 |
| 190 | −1.23 | −0.890 | 0.305 | −0.0833 | 0.525 | 0.572 |
| 195 | −1.18 | −1.14 | 0.280 | −0.0866 | 0.572 | 0.562 |
| 200 | −1.25 | −1.35 | 0.283 | −0.0894 | 0.607 | 0.556 |
| 205 | −1.53 | −1.52 | 0.344 | −0.0915 | 0.630 | 0.598 |
| 210 | −2.53 | −1.64 | 0.458 | −0.101 | 0.655 | 0.625 |

TABLE 7

A comparison of $\Delta\rho_{norm}$ for the $1^{st}$, $3^{rd}$, and $5^{th}$ measurements for 5 wt. % loading

| | $\Delta\rho_{norm}$ | | | | | |
|---|---|---|---|---|---|---|
| | 5 wt. % PI/VGCNF | | | 5 wt. % PI/CP2-g-VGCNF | | |
| °C. | $1^{st}$ | $3^{rd}$ | $5^{th}$ | $1^{st}$ | $3^{rd}$ | $5^{th}$ |
| 25 | 0.0000 | 0.0000 | 0.0000 | 0.0000 | 0.0000 | 0.0000 |
| 45 | −0.12343 | −0.12112 | −0.18178 | 0.014939 | 0.025600 | 0.023436 |
| 65 | −0.233 | −0.300 | −0.400 | 0.0465 | 0.0565 | 0.0528 |
| 85 | −0.273 | −0.370 | −0.612 | 0.0973 | 0.0948 | 0.0899 |
| 105 | −0.306 | −0.532 | −0.878 | 0.160 | 0.141 | 0.135 |
| 125 | −0.411 | −0.916 | −1.25 | 0.234 | 0.1980 | 0.190 |
| 145 | −0.467 | −1.04 | −1.35 | 0.311 | 0.262 | 0.253 |
| 165 | −0.533 | −0.878 | −1.31 | 0.390 | 0.328 | 0.320 |
| 185 | −0.708 | −0.552 | −1.08 | 0.484 | 0.402 | 0.394 |
| 190 | −0.890 | −0.512 | −0.945 | 0.525 | 0.425 | 0.416 |
| 195 | −1.14 | −0.692 | −1.01 | 0.572 | 0.459 | 0.452 |
| 200 | −1.35 | −0.795 | −1.10 | 0.607 | 0.498 | 0.493 |
| 205 | −1.52 | −0.862 | −1.17 | 0.630 | 0.538 | 0.536 |
| 210 | −1.64 | −0.925 | −1.22 | 0.655 | 0.583 | 0.586 |

These data demonstrate that the compositions of this invention (e.g., PI/CP2-g-VGCNF films) can be used in a device to measure temperature (e.g., via conductivity measurements) or as a part of a device that uses temperature determination as part of its operation.

Having described the invention in detail and by reference to specific embodiments thereof, it will be apparent that modifications and variations are possible without departing from the scope of the invention defined in the appended claims. More specifically, although some aspects of the present invention may be identified herein as preferred or particularly advantageous, it is contemplated that the present invention is not necessarily limited to these preferred aspects of the invention.

What is claimed is:

1. A method for producing functionalized carbon nanofibers comprising:
   providing carbon nanofibers;
   providing a first reactant selected from the group consisting of

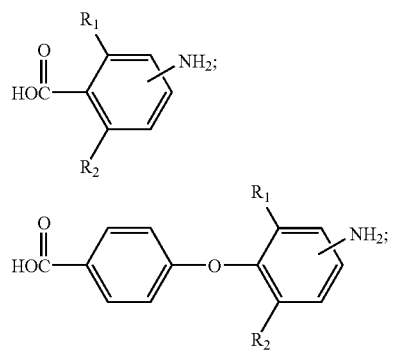

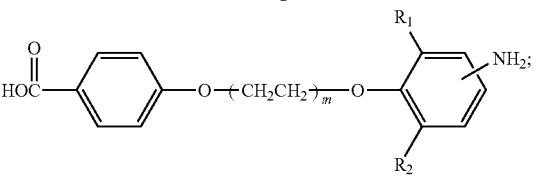

wherein $R_1$ and $R_2$ can be the same or different and are selected from the group consisting of hydrogen and $C_{1-4}$ alkyl, and m ranges from 1 to 20;
   reacting the first reactant with the carbon nanofibers to produce a first reaction product; and
   recovering the functionalized carbon nanofibers from the first reaction product.

2. The method of claim 1 whereby the first reactant is 3-aminophenoxy-4-benzoic acid.

3. The method of claim 1 whereby the carbon nanofibers are vapor grown carbon nanofibers.

4. A method for producing functionalized carbon nanofibers comprising:
   providing carbon nanofibers;
   providing a first reactant selected from the group consisting of

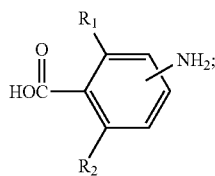

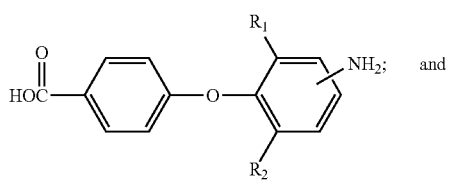

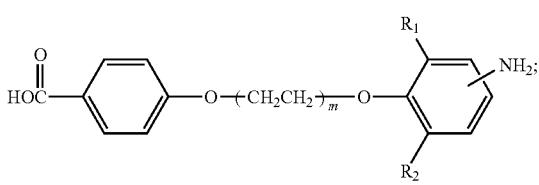

wherein $R_1$ and $R_2$ can be the same or different and are selected from the group consisting of hydrogen and $C_{1-4}$ alkyl, and m ranges from 1 to 20;

reacting the first reactant with the carbon nanofibers to produce a first reaction product;

reacting 2,2-bis(phthalic anhydride)-1,1,1,3,3,3-hexafluoroisopropane and 1,3-bis(3-aminophenoxy)benzene to produce a poly(amic acid);

reacting the first reaction product with the poly(amic acid) to produce a second reaction product; and recovering the functionalized carbon nanofibers from the second reaction product.

5. The method of claim 4 whereby the first reactant is 3-aminophenoxy-4-benzoic acid.

6. The method of claim 4 whereby the carbon nanofibers are vapor grown carbon nanofibers.

7. The method of claim 4 whereby reacting 2,2-bis(phthalic anhydride)-1,1,1,3,3,3-hexafluoroisopropane and 1,3-bis(3-aminophenoxy)benzene to produce a poly(amic acid) is performed in-situ.

8. The method of claim 4 whereby the functionalized carbon nanofibers comprise at least one moiety selected from the group consisting of -continued

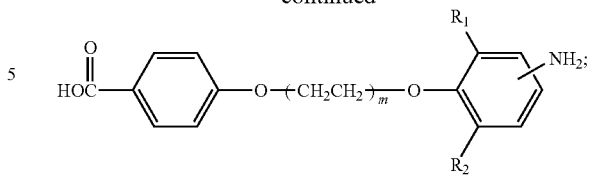

wherein $R_1$ and $R_2$ can be the same or different and are selected from the group consisting of hydrogen and $C_{1-4}$ alkyl, and m ranges from 1 to 20;

reacting the first reactant with the carbon nanofibers to produce a first reaction product;

reacting 2,2-bis(phthalic anhydride)-1,1,1,3,3,3-hexafluoroisopropane and 1,3-bis(3-aminophenoxy)benzene to produce a poly(amic acid);

reacting the first reaction product with the poly(amic acid) to produce a second reaction product;

treating the second reaction product to produce a third reaction product;

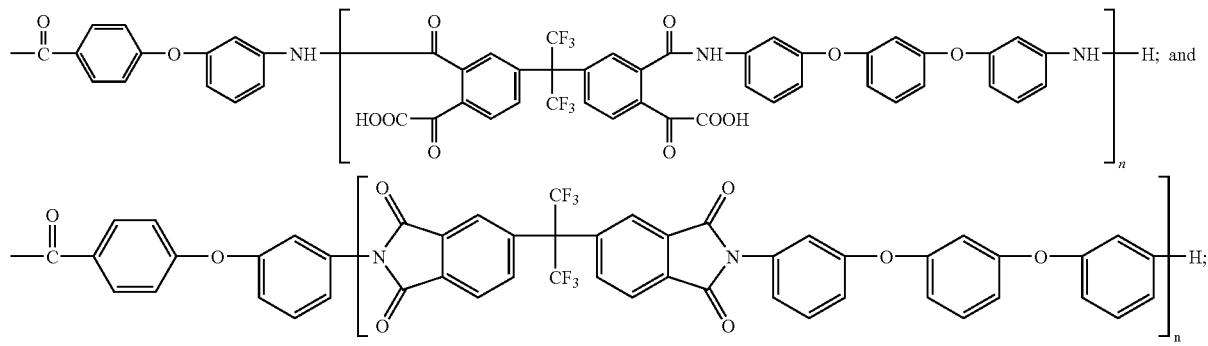

wherein n ranges from 2 to 50.

9. A method for producing a nanocomposite comprising functionalized carbon nanofibers comprising:

providing carbon nanofibers;

providing a first reactant selected from the group consisting of

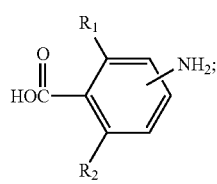

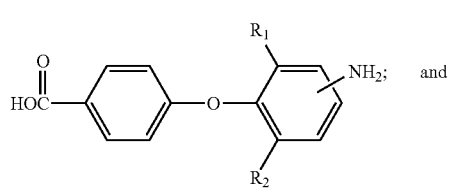

optionally heating the third reaction product to produce a fourth reaction product; and recovering the nanocomposite comprising functionalized carbon nanofibers from the third reaction product or the fourth reaction product.

10. The method of claim 9 whereby the first reactant is 3-aminophenoxy-4-benzoic acid.

11. The method of claim 9 whereby the step of treating the second reaction product to produce a third reaction product occurs by chemical imidization, thermal imidization, or both.

12. The method of claim 9 whereby the nanocomposite comprising functionalized nanofibers is a film or a fibrous material.

13. The method of claim 9 whereby the carbon nanofibers are vapor grown carbon nanofibers.

14. The method of claim 9 whereby reacting 2,2-bis(phthalic anhydride)-1,1,1,3,3,3-hexafluoroisopropane and 1,3-bis(3-aminophenoxy)benzene to produce a poly(amic acid) is performed in-situ.

15. The method of claim 9 whereby the functionalized carbon nanofibers comprise at least one moiety selected from the group consisting of

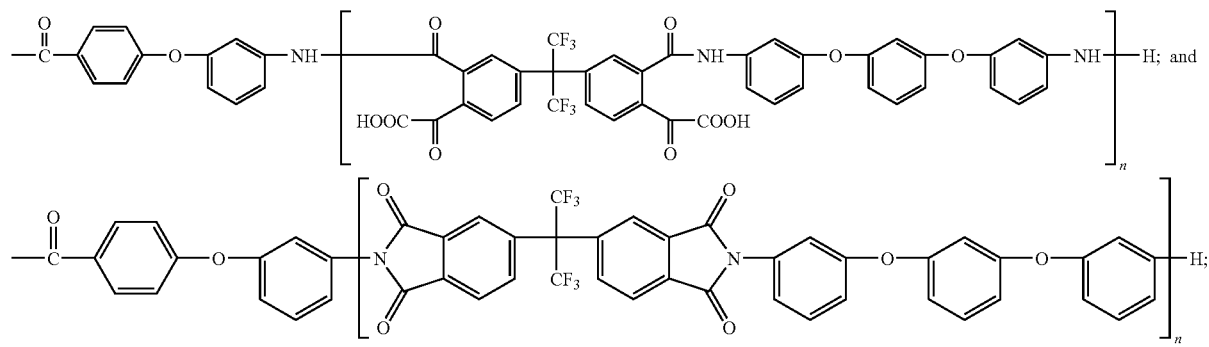
wherein n ranges from 2 to 50.
16. The method of claim 9 whereby the heating the third reaction product to produce a fourth reaction product is required.
17. The method of claim 16 whereby the heating the third reaction product to produce a fourth reaction product is performed at a pressure less than or equal to atmospheric pressure.
\* \* \* \* \*